(12) United States Patent
Akita et al.

(10) Patent No.: US 6,951,373 B2
(45) Date of Patent: Oct. 4, 2005

(54) CRAWLER BELT AND SEAL FOR USE THEREIN

(75) Inventors: Hideki Akita, Tsuchiura (JP); Yoshiaki Sekiguchi, Yasato-machi (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 18 days.

(21) Appl. No.: 10/168,100

(22) PCT Filed: Feb. 13, 2002

(86) PCT No.: PCT/JP01/09224

§ 371 (c)(1),
(2), (4) Date: Jun. 13, 2002

(87) PCT Pub. No.: WO02/36418

PCT Pub. Date: May 10, 2002

(65) Prior Publication Data

US 2003/0153424 A1 Aug. 14, 2003

(30) Foreign Application Priority Data

Nov. 2, 2000 (JP) ........................... 2000-336127

(51) Int. Cl.⁷ ............................................... B62D 55/20
(52) U.S. Cl. ...................... 305/103; 305/104; 277/628; 474/901
(58) Field of Search ................................. 305/103, 104; 474/207, 230, 234, 236, 901; 277/628, 644, 647; 384/130, 140, 147, 151, 153

(56) References Cited

U.S. PATENT DOCUMENTS

| | | | | |
|---|---|---|---|---|
| 3,909,076 A | * | 9/1975 | Kato | 305/104 |
| 3,948,574 A | * | 4/1976 | Baylor | 305/103 |
| 3,958,836 A | * | 5/1976 | Brown et al. | 474/91 |
| 3,975,028 A | * | 8/1976 | Satsumabayashi et al. | 305/103 |
| 4,062,550 A | * | 12/1977 | Satsumabayashi et al. | 277/380 |
| 4,204,716 A | * | 5/1980 | Baylor | 305/103 |
| 4,364,572 A | * | 12/1982 | Yamamoto et al. | 277/380 |

FOREIGN PATENT DOCUMENTS

| | | |
|---|---|---|
| JP | 49-113342 | 9/1974 |
| JP | 52-61029 | 5/1977 |
| JP | 1-65773 | 4/1989 |

* cited by examiner

Primary Examiner—David A. Bucci
Assistant Examiner—Bradley J. Van Pelt
(74) Attorney, Agent, or Firm—Mattingly, Stanger, Malur & Brundidge, P.C.

(57) ABSTRACT

A seal (21) is constituted by an outer lip portion (22) to be held in abutting engagement with an outer link portion (9) of a crawler belt (7), an inner lip portion (23) to be held in abutting engagement with a bush (11), and an interconnecting bridge portion (24) bridged and connected between the outer and inner lip portions (22, 23). The outer lip portion (22) on the side of track link, the inner lip portion (23) on the side of bush, and outer bridge portion (24A) and inner bridge portion (24B) of the interconnecting bridge portion (24) are formed in thicknesses (T1, T2, T1' and T2'), respectively, which are in the relations of (T2≈T2'>T1≈T1'). A maximum outside diameter portion (24C) of the interconnecting bridge portion (24) is located radially outward of a median point between inner and outer peripheral ends of the lip portion (23) on the side of bush. The inner lip portion (23) as a whole is uniformly pressed against an end face (11A) of the bush (11) by the interconnecting bridge portion (24).

12 Claims, 8 Drawing Sheets ly in high surface pressure areas. Therefore, the above-described arrangement does not necessarily help to improve the durability of the crawler belt seal to a sufficient degree.

CRAWLER BELT AND SEAL FOR USE THEREIN

TECHNICAL FIELD

This invention relates to a crawler belt and a crawler belt seal suitable for use on crawler type vehicles, for example, on hydraulic excavators, hydraulic cranes and the like.

BACKGROUND ART

Generally, crawler belts which are used on crawler type vehicles such as hydraulic excavator and the like are largely constituted by rows of endlessly connected right and left track links each formed with an outer link portion and an inner link portions at longitudinally opposite ends, respectively, bushes interposed transversely between the inner link portions of the right and left track links and each having opposite axial ends thereof located face to face with outer link portions of the right and left track links, and connecting pins placed in the respective bushes and each having opposite axial ends thereof coupled with the outer link portions by fitting engagement therewith.

The prior art crawler belt of this sort is lapped around an idle wheel and a drive wheel and rolled on or back between and around these wheels by driving the drive wheel from a hydraulic motor or the like to drive a vehicle body in a forward or reverse direction.

Further, in the case of the prior art crawler belt as mentioned above, annular seal members of substantially M-shape in cross-section are fitted between the outer link portions of the track links and the bushes for the purpose of preventing dirt from getting between the bushes and connecting pins while the vehicle is in travel (e.g., as disclosed in Japanese Utility Model Laid-Open No. S49-113342).

In this case, each seal member is constituted by a first lip portion to be abutted against an inner end face of an outer link portion of track link, a second lip portion to be abutted against an end face of a bush, and an interconnecting bridge portion which is bridged between the first and second lip portions to connect same with each other.

According to another prior art crawler belt seal, an abutting surface (hereinafter referred to as "a seal surface" for brevity) of a lip portion on the side of bush, that is to say, a seal surface to be held in abutting engagement with a bush is provided with a ridge portion at a position which is spaced radially outward from a radially inner end of the lip portion (e.g., Japanese Utility Model Laid-Open No. H1-65773).

By the way, in the case of the prior art crawler belt seal which is described in the above-mentioned Japanese Utility Model Laid-Open No. S49-113342, the wall thickness of the lip portion on the side of bush is partly increased thereby to increase a range of allowance for abrasive wear of the lip portion on the side of bush and to enhance its durability.

However, a study on surface pressures which is exerted on the crawler belt seal of the above described prior art construction reveals that the surface pressure on a lip portion on the side of bush has a tendency to increase in certain localities on the inner peripheral side of the lip portion. Therefore, even if wall thickness of the lip portion on the side of bush is increased as described above, abrasive wear of the lip portion progresses considerably in high surface pressure areas. Therefore, the above-described arrangement does not necessarily help to improve the durability of the crawler belt seal to a sufficient degree.

In addition, the surface pressure on the lip portion on the side of bush is elevated only in limited localities, so that it is difficult to improve the seal capacity or strength to a sufficient degree by the lip portion on the side of bush.

Further, in the case of the crawler belt seal as described in the above-mentioned Japanese Utility Model Laid-Open No. H1-65773, attempts were made to increase the seal capacity of the lip portion on the side of bush by providing a ridge portion on the seal surface at a position which is spaced in a radially outward direction from an inner peripheral end of the seal, for increasing the surface pressure at two different positions, namely, at the ridge portion and at the inner peripheral end portion of the seal.

However, as a hydraulic excavator is steered while it is put in travel on a working site, for example, gap spaces which exist in the thrust direction between outer link portions and bushes of the crawler belt are repeatedly and incessantly subjected to a phenomenon in which each gap space is temporarily opened wide and closed. On such an occasion, the ridge portion on the seal surface is momentarily caused to move away from the bush, allowing dirt to intrude into a space between the ridge portion and the root portion of the seal. Once dirt is allowed to get into a gap space between the ridge and root or inner peripheral end portions of the seal, it is confined there to accelerate abrasive wear of the seal surface.

Besides, the provision of a ridge portion on the lip portion on the side of bush makes the seal complicate in shape as a whole, which would be reflected by lower production efficiency of the seal.

DISCLOSURE OF THE INVENTION

In view of the above-discussed problems with the prior art, it is an object of the present invention to provide a crawler belt and a crawler belt seal, which can maintain uniform surface pressure on a seal surface on the side of bush and can guarantee improved seal capacity or strength and durability by the use of seal members of a simplified construction.

In order to solve the above-discussed problems, the present invention contemplates to provide a crawler belt having endlessly connected right and left track links each formed with an outer link portion and an inner link portion at opposite longitudinal ends thereof, respectively, bushes located transversely between inner link portions of the track links and having opposite axial ends in face to face relation with the outer link portions, connecting pins placed in the bushes and having opposite axial end portions fitted in and connected to the outer link portions, and a seal fitted around outer periphery of each one of the connecting pins and between an outer link portion of the track links and an opposing end of the bush.

The crawler belt according to the present invention is characterized in that: the seal is comprised of an outer lip portion provided on the side of track link and held in abutting engagement with an inner end face of the outer link portion, an inner lip portion provided on the side of bush and held in abutting engagement with an end face of the bush, and an interconnecting bridge portion of V-shape in cross-section bridged between the outer and inner lip portions and to interconnect same integrally with each other; the interconnecting bridge portion of V-shape is comprised of an outer bridge portion obliquely connected to an inner peripheral end of the outer lip portion on the side of track link, and an inner bridge portion obliquely connected to an inner peripheral end of the inner lip portion on the side of bush; the inner lip portion on the side of bush is formed in a thickness which is substantially same as thickness of the inner bridge portion on the side of bush; the inner lip portion and the inner bridge portion on the side of bush are set at a value larger in thickness than the outer lip portion and the outer bridge portion on the side of track link; and a maximum outside diameter portion in a boundary region between the outer bridge portion and the inner bridge portion of the interconnecting bridge portion is located radially outward of a median position between inner and outer peripheral ends of the inner lip portion on the side of bush.

With the arrangements just described, when the seal is fitted between an outer link portion of a track link and a bush, the interconnecting bridge portion of the seal is compressed and deformed between the outer lip portion on the side of track link and the inner lip portion on the side of bush, and at the same time the outer and inner lip portions of the seal are abutted against an inner end face of the outer link portion and an end face of the bush with a certain range of resilience, respectively, to seal up a gap space or interstice between the outer link portion and the bush.

In this instance, the inner lip portion on the side of bush is formed in a greater thickness than the outer lip portion and the outer bridge portion of the seal to secure a greater margin or allowance for abrasive wear of the inner lip portion on the side of bush. In addition, since the inner bridge portion on the side of bush is formed substantially in the same thickness as the inner lip portion of the side of bush, the surface pressure of the inner lip portion which is abutted against a bush can be uniformly elevated.

Further, a maximum outside diameter portion of the interconnecting bridge portion of the seal is located radially outward of a median position between inner and outer peripheral ends of the inner lip portion on the side of bush, so that the inner lip portion as a whole can be uniformly pressed against an opposing end face of the bush by the interconnecting bridge portion.

In this instance, according to the present invention, the thickness of the outer lip portion on the side of track link is set at a value substantially same as that of the outer bridge portion on the side of track link. The outer lip portion of the seal can be abutted against an outer link portion of a track link with uniform surface pressure to augment the seal capacity or force of the outer lip portion.

Further, according to a preferred form of the present invention, a maximum inside diameter portion in a boundary region between the outer bridge portion and the inner bridge portion of the interconnecting bridge portion is located radially inward of a median position of inner and outer peripheral ends of the inner lip portion on the side of bush. In this case, it becomes possible to secure a sufficient wall thickness for the interconnecting bridge portion between the maximum outside diameter portion and the maximum inside diameter portion for enhancing resilient force (restoration force) to be produced in the interconnecting bridge portion when the seal is compressed between a outer link portion and a bush.

Further, according to another preferred form of the present invention, the inner lip portion on the side of bush is provided with a flat abutting surface for abutting engagement with an end face of the bush. With this arrangement, the inner lip portion as a whole can be abutted against the bush with substantially uniform surface pressure.

Further, according to still another preferred form of the present invention, the outer lip portion on the side of track link is provided with a flat abutting surface for abutting engagement with the outer link portion. With this arrangement, the outer lip portion as a whole can be abutted against an outer link portion with substantially uniform surface pressure.

According to the present invention, there is also provided a crawler belt seal, which comprises: an outer lip portion provided on the side of track link and held in abutting engagement with an inner end face of an outer link portion of the track link, an inner lip portion provided on the side of bush and held in abutting engagement with an end face of the bush, and an interconnecting bridge portion of V-shape in cross-section bridged between the outer and inner lip portions and to interconnect same integrally with each other; the interconnecting bridge portion of V-shape having an outer bridge portion obliquely connected to an inner peripheral end of the outer lip portion on the side of track link, and an inner bridge portion obliquely connected to an inner peripheral end of the inner lip portion on the side of bush; the inner lip portion on the side of bush being formed to have thickness which is substantially same as thickness of the inner bridge portion on the side of bush; the thicknesses of the inner lip portion and the inner bridge portion on the side of bush being set at a value larger than thicknesses of the outer lip portion and the outer bridge portion on the side of track link; and a maximum outside diameter portion in a boundary region between the outer bridge portion and the inner bridge portion of the interconnecting bridge portion being located radially outward of a median position line between inner and outer peripheral ends of the inner lip portion on the side of bush.

In this case, according to the present invention, the thickness of the outer lip portion on the side of track link is set at a value which is substantially same as the thickness of the outer bridge portion on the side of track link.

Further, according to the present invention, a maximum inside diameter portion in a boundary region between the outer bridge portion and the inner bridge portion of the interconnecting bridge portion is located radially inward of a median position line of the inner lip portion on the side of bush.

Furthermore, according to the present invention, the inner lip portion on the side of bush is provided with a flat abutting surface for abutting engagement with an end face of the bush. According to the present invention, the outer lip portion on the side of track link is provided with a flat abutting surface for abutting engagement with the outer link portion.

BEST MODE FOR CARRYING OUT THE INVENTION

Figure 1:
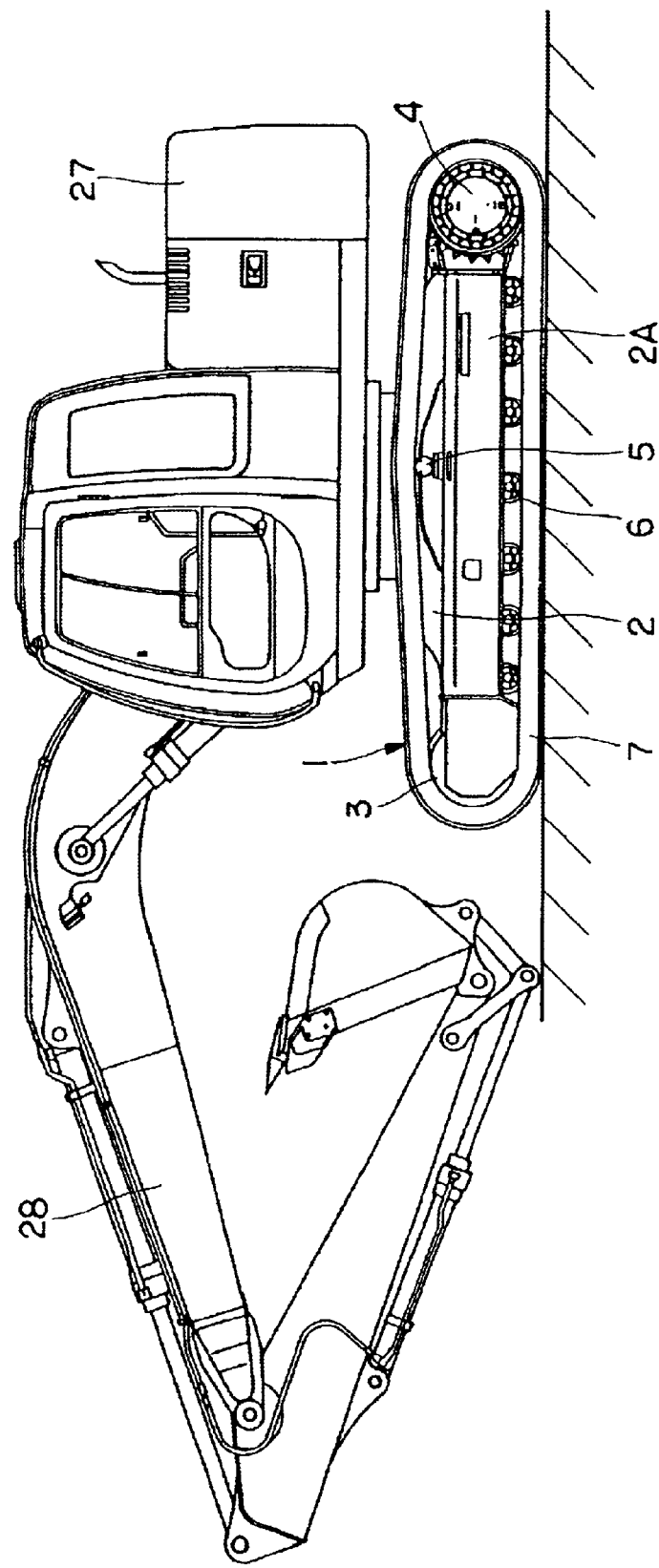
FIG. 1 is a schematic outer view of a hydraulic excavator embodying the present invention is applied.

Hereafter, the crawler belt according to the present invention is described more particularly by way of its preferred embodiment which is applied to a hydraulic excavator, with reference to FIGS. 1 through 7 of the accompanying drawings.

Referring to FIGS. 1 through 7, there is shown a hydraulic excavator embodying the present invention. In these figures, indicated at 1 is a lower structure of the hydraulic excavator. The lower structure 1 includes a track frame 2 having right and left side frames 2A (only one of which is shown in the drawings) which are extended in the longitudinal direction of the vehicle, an idler wheel 3 and a drive sprocket 4 which are provided at the front are rear ends of each side frame 2A of the track frame 2, and a crawler belt 7 which is wrapped around and between the idler wheel 3 and drive sprocket 4.

Provided on the side frame 2A of the track frame 2 are an upper roller 5 and a plural number of lower rollers 6 to guide the crawler belt 7 on the upper and lower sides of the side frame 2A, respectively.

Indicated at 7 is a crawler belt which is lapped around and between the idler wheel 3 and drive sprocket 4. The crawler belt 7 is largely constituted by track links 8, bushes 11, connecting pins 12 and track shoes 13, which will be described after. The crawler belt is rotationally driven and rolled forward or backward between and around the idle and wheel wheels 3 and 4 by the drive wheel 4 which is meshing engagement with the bushes 11, which are provided in the connecting portions of the track links 8 of the crawler belt 7.

Figure 4:
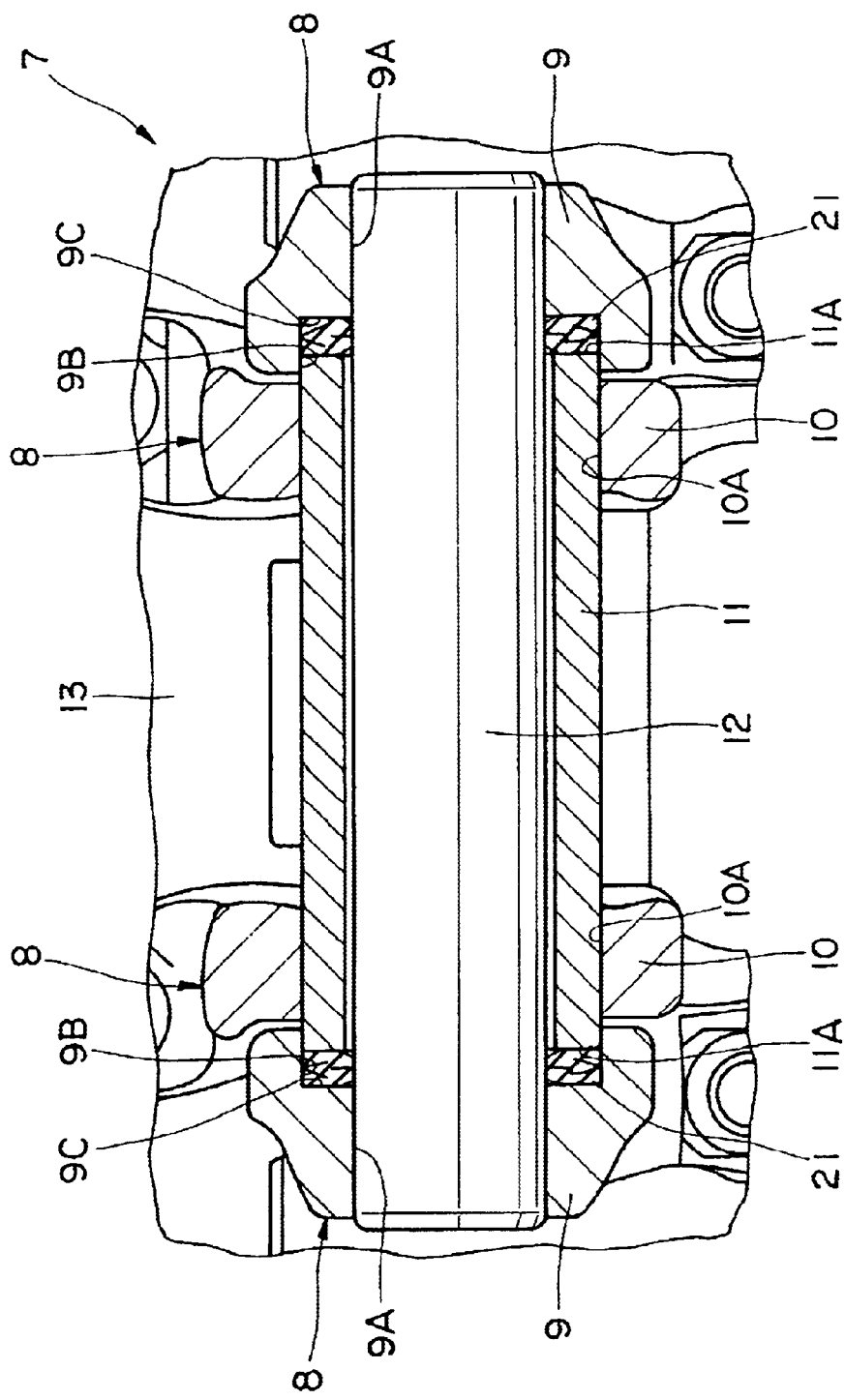
FIG. 4 is a fragmentary sectional view on an enlarged scale of coupled portions of track links shown in FIG. 3.
Figure 6:
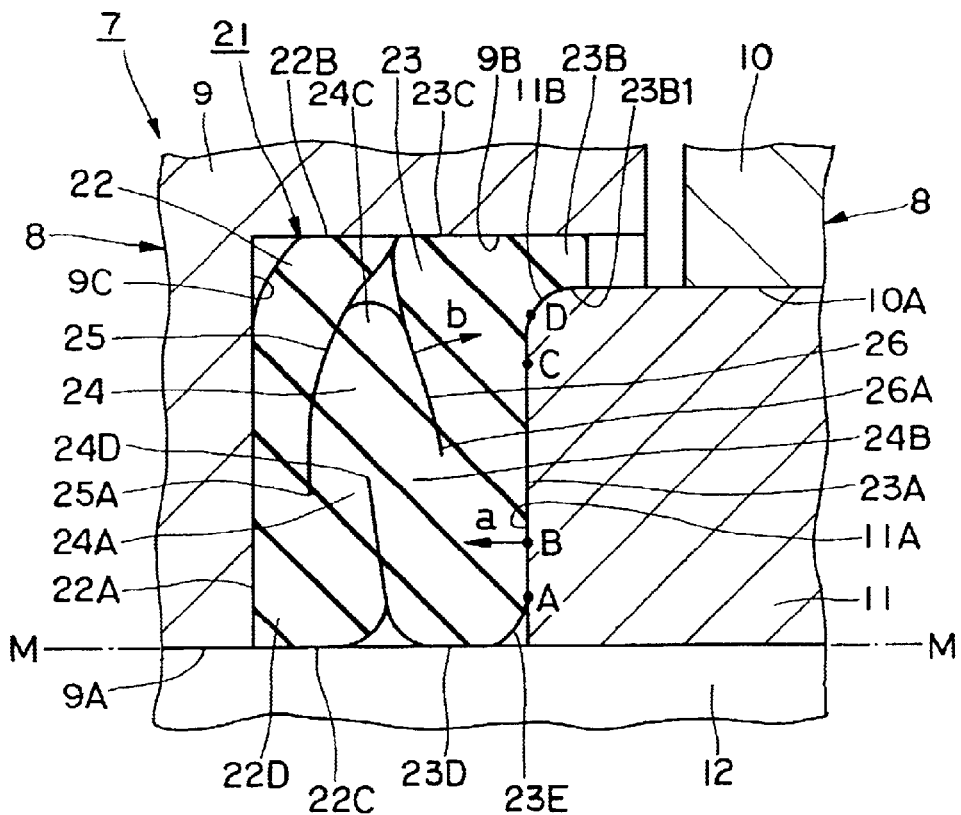
FIG. 6 is an enlarged sectional view of an outer link portion, bush and seal member shown in FIG. 4.

Indicated at 8 are endlessly connected right and left rows of track links which are positioned to confront each other in transversely spaced positions. The track links 8 are each extended in the longitudinal direction of the crawler belt 7. An outer link portion 9 is formed at one longitudinal end of each track link unit 8. As shown in FIGS. 4 and 6, the outer link portion 9 is provided with a pin receiving bore 9A to receive a connecting pin 12, a seal fitting bore 9B which is formed by concentrically spreading inner periphery of an inner end portion of the pin receiving bore 9A on the side of a bush 11 to receive a seal 21, which will be described after, and an inner end face 9C which is formed as a stepped wall between the pin receiving bore 9A and the seal fitting bore 9B.

Further, an inner link portion 10 is formed at the other longitudinal end of each unit of the track links 8. A bush receiving bore 10A is formed in the inner link portion 10 to receive therein a bush 11 as described below.

Denoted at 11 are bushes which are interposed between the inner link portions 10 of the right and left track links 8. Each bush 11 is arranged to receive a connecting pin 12 on the inner peripheral side thereof and provided with end faces 11A at its opposite ends. Each bush 11 is placed in the bush receiving bores 10A of inner link portions 10 by press-in fitting, with its opposite ends being received and located in the seal fitting bore 9B of an outer link portion 9 in such a way as to oppose the latter through a gap space. An arcuate chamfered surface 11B is provided around the outer peripheral, marginal edge of each end face 11A of the bush 11.

Indicated at 12 are connecting pin which interconnect the two rows of track links 8. Each connecting pin 12 is inserted in the bush 11 in such a way as to leave a small gap therebetween. The opposite ends of the connecting pin 12 are placed in the pin receiving holes 9A of the outer link portions 9 by press-in fitting. Grease or other lubricant is filled in the gap space between the connecting pin 12 and the bush 11 thereby to ensure smooth relative rotations of these parts.

Figure 2:
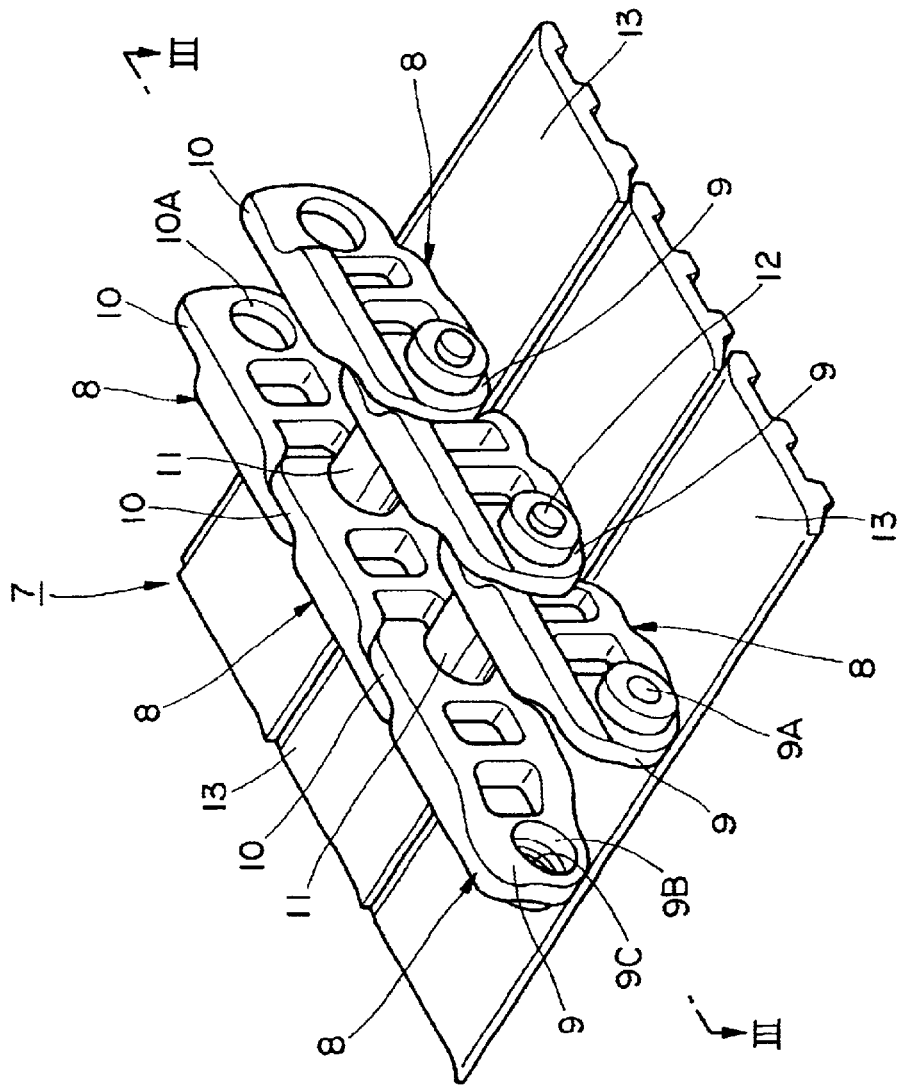
FIG. 2 is an enlarged perspective view of a crawler belt shown in FIG. 1.
Figure 3:
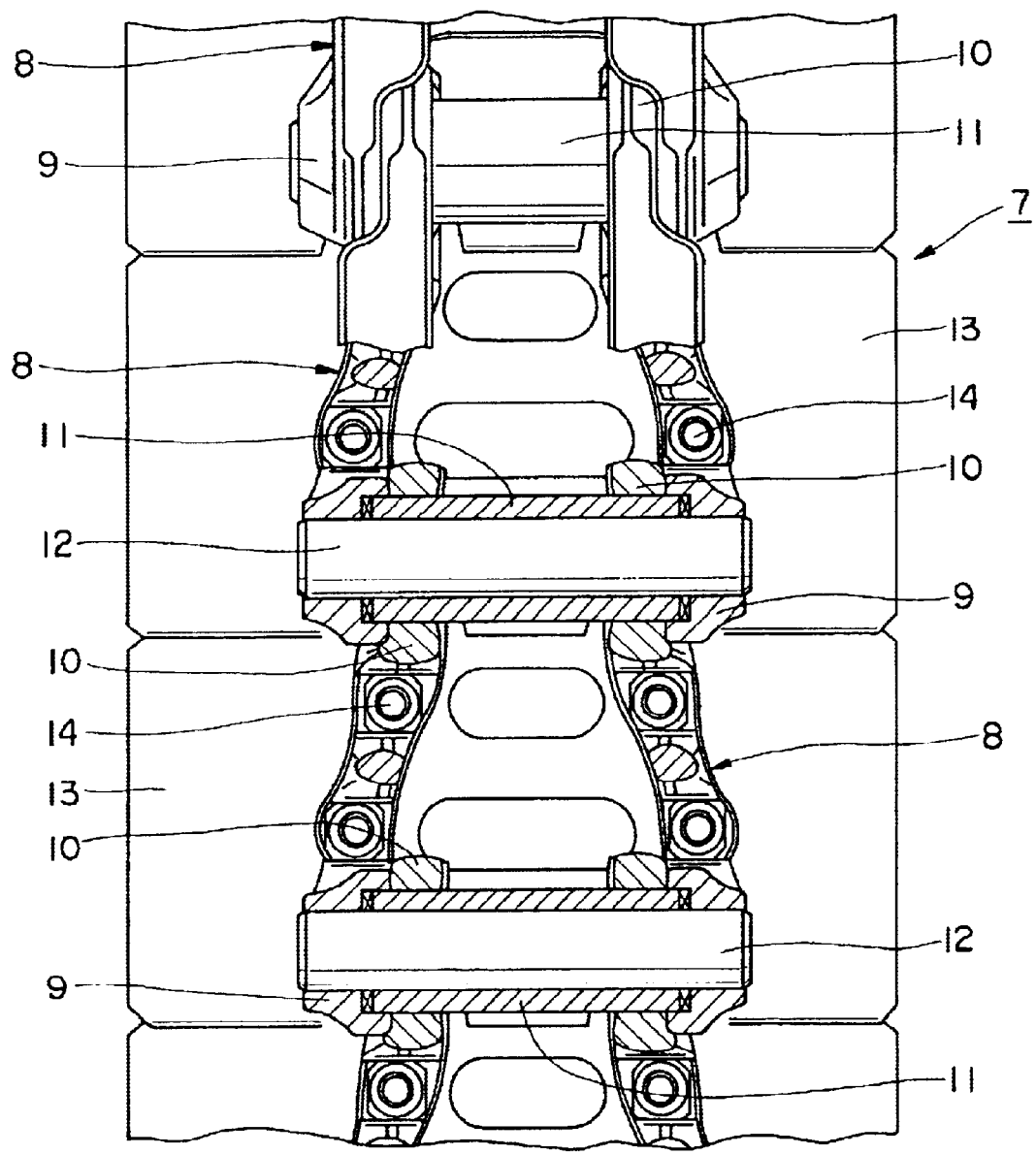
FIG. 3 is a partly cutaway plan view of the crawler belt, taken from the direction of arrows III—III of FIG. 2.

Indicated at 13 are track shoes which are each formed of a metal plate and attached to the right and left track links 8. As shown in FIGS. 2 and 3, these track shoes 13 are securely fixed to the outer side of the track links 8 by the use of a plural number of bolts 14 to form treading surfaces of the crawler belt 7. Namely, the right and left track links 8 are integrally connected to each other through the track shoes 13.

Figure 5:
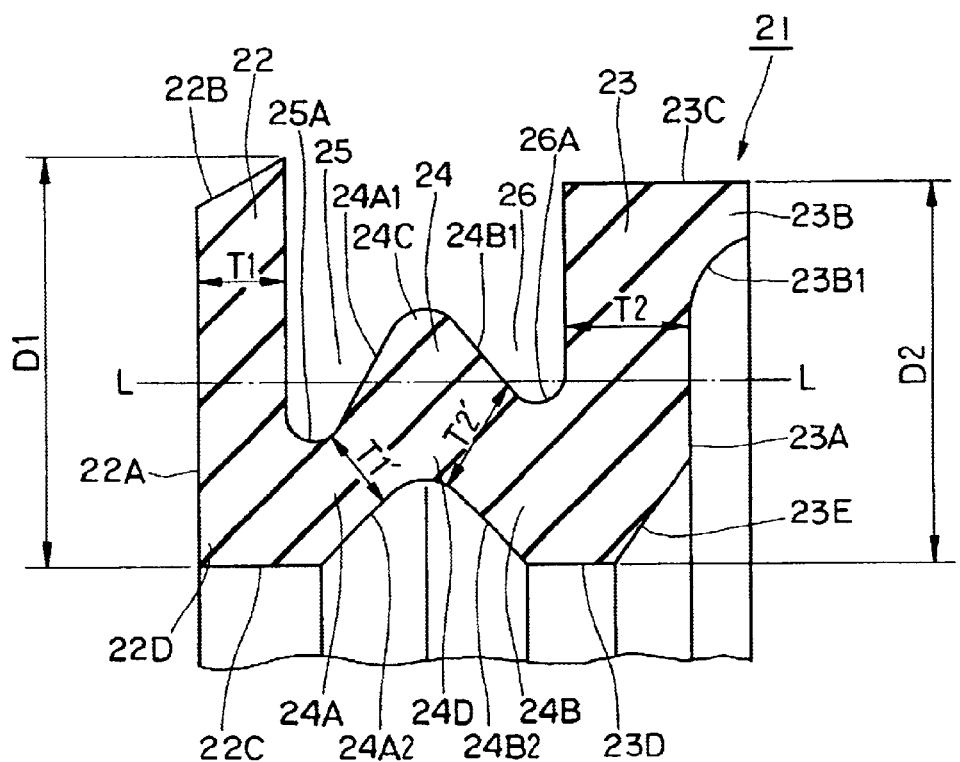
FIG. 5 is an enlarged sectional view of one crawler belt seal member shown in FIG. 4.

Designated at 21 are right and left seal which are provided around the circumference of the connecting pin 12 and between the bush 11 and the outer link portions 9 of the track links 8. Each seal 21 has an annular body presenting an M-shape in cross-section and is formed by the use of a resilient synthetic resin material, for example, such as urethane rubber, nitrile rubber or the like. In a free state, the seal 21 presents the shape as shown in FIG. 5. Further, each seal 21 is composed of an outer lip portion 22 on the side of the link, an inner lip portion 23 on the side of bush and an interconnecting bridge portion 24, which will be described hereinafter.

The seal 21 is fitted in a compressed state between the outer link portion 9 and the bush 11 thereby to prevent dirt or other foreign matter from getting into a gap space between the bush 11 and the connecting pin 12 and at the same time to seal up grease in that gap space.

Indicated at 22 is an outer lip portion on the side of track link, that is to say, a lip portion which is held in abutting engagement with an inner end face 9C of the outer link portion 9. As shown in FIG. 5, the outer lip portion 22 on the side of track link is formed in a flat plate-like shape and has a substantially uniform thickness T1. Further, the outer lip portion 22 on the side of track link has a radial width D1, which is slightly larger than a radial width D2 of the inner lip portion 23 on the side of bush, which will be described hereinafter. Namely, the radial widths D1 and D2 of the lip portions 22 and 23 are in the dimensional relation as expressed by the following formula (1).

$$D1 > D2 \qquad (1)$$

The outer lip portion 22 on the side of track link is provided with an abutting surface 22A on its front or outer side to be abutted against the inner end face 9C of the outer link portion 9 with a certain range of resilience. The abutting surface 22A forms a seal surface which seals up an interstice between the abutting surface 22A and the outer link portion 9 liquid tight. In this instance, the abutting surface 22A of the lip portion 22 on the side of track link is formed as a flat surface which stretches parallel with the inner end face 9C of the outer link portion 9.

Further, the outer lip portion 22 on the side of track link is provided with an outwardly converging tapered (conical) portion 22B around its outer periphery. The abutting surface 22A of the lip portion 22 on the side of track link is disposed substantially normal to its inner periphery 22C, forming a corner portion 22D substantially of right angles therebetween.

Indicated at 23 is an inner lip portion on the side of bush, which is held in abutting engagement with the end face 11A of the bush 11. The inner lip portion 23 on the side of bush is formed in a flat plate-like shape having a thickness T2 which is larger than thickness T1 of the lip portion 22 on the side of track link and thickness T1' of a bridge portion 24A on the side of track link which will be described hereinafter. Namely, the thickness of the lip portion 23 on the side of bush is in the dimensional relations as expressed by the following formula (2).

$$\left.\begin{array}{l} T2 > T1 \\ T2 > T1' \end{array}\right\} \quad (2)$$

Provided on the front side of the inner lip portion 23 on the side of bush is an abutting surface 23A to be abutted against the end face 11A of the bush 11 with a certain range of resilience. The abutting surface 23A forms a seal surface which seals up an interstice between the abutting surface 23A and the end face 11A of the bush 11 liquid tight. In this instance, the abutting surface 23A of the lip portion 23 on the side of bush 11 is formed as a flat surface which stretches parallel with the end face 11A of the bush 11.

Further, the abutting surface 23A of the lip portion 23 on the side of bush is provided with an annular projection 23B along and around its outer periphery. The annular projection 23B is provided with a concave surface 23B1 having an arcuately curved shape in section, correspondingly to the chamfered surface 11B of the bush 11. An interstice or gap space between the bush 11 and the annular projection 23B is sealed up by the concave surface 23B1 together with abutting surface 23A.

Moreover, the inner lip portion 23 on the side of bush is provided with an axially straight surface around its outer periphery 23C. In addition, the lip portion 23 on the side of bush is provided with a tapered portion 23E under the abutting surface 23A, the tapered portion being gradually receded from the abutting surface toward the inner periphery 23D.

Indicated at 24 is an interconnecting bridge portion which is provided between the lip portion 22 on the side of track link and the lip portion 23 on the side of bush to interconnect these two lip portions 22 and 23 integrally with each other. The interconnecting bridge portion 24 is formed in an inverted V-shape in section. More specifically, the interconnecting bridge portion 24 is constituted by an outer bridge portion 24A which is gradually reduced in diameter to extend obliquely toward and connected to the inner end of the lip portion 22 on the side of track link, and an inner bridge portion 24B which is gradually reduced in diameter to extend obliquely toward and connected to the inner end of the lip portion 23 on the side of bush.

In this instance, as shown in FIG. 5, the outer bridge portion 24A on the side of track link is formed in a thickness T1' which is substantially equivalent to the thickness T1 of the outer lip portion 22 on the side of track link, namely, in the dimensional relation as expressed by the following formula (3).

$$T1' \approx T1 \quad (3)$$

Further, the inner bridge portion 24B on the side of bush is formed in a thickness which is substantially same as thickness T2 of inner the lip portion 23 on the side of bush, as expressed by the following formula (4).

$$T2' \approx T2 \quad (4)$$

Accordingly, the thickness T2 of the inner lip portion 23 on the side of bush as well as the thickness T2' of the inner bridge portion 24B on the side of bush is larger than the thicknesses T1 of the outer lip portion 22 and the thickness T1' of the outer bridge portion 24A on the side of track link, as expressed by the following formula (5).

$$T2 \approx T2' > T1 \approx T1' \quad (5)$$

A maximum outside diameter portion 24C of the interconnecting bridge portion 24, at the boundaries between an outer peripheral surface 24A1 of the outer bridge portion 24A on the side of track link and an outer peripheral surface 24B1 of the inner bridge portion 24B on the side of bush, is located radially outward of an intermediate reference line L—L as a median position between inner and outer peripheral ends of the inner lip portion 23 on the side of bush.

On the other hand, a maximum inside diameter portion 24D of the interconnecting bridge portion 24, at the boundaries between inner peripheral surface 24A2 of the outer bridge portion 24A on the side of track link and inner peripheral surface 24B2 of the inner bridge portion 24B on the side of bush, is located radially inward of the intermediate reference line L—L as the median position between inner and outer peripheral ends of the inner lip portion 23 on the side of bush.

Indicated at 25 is an outer circumferential groove which is provided between the outer lip portion 22 on the side of track link and the interconnecting bridge portion 24. This outer circumferential groove 25 is formed as an annular groove of U- or V-shape in section, between the lip portion 22 on the side of track link and outer periphery 24A1 of the outer bridge portion 24A. Further, the outer circumferential groove 25 is provided with an arcuately curved root portion 25A, which is located radially inward of a median position (the intermediate reference line L—L) between inner and outer peripheral ends of the lip portion 23 on the side of bush.

Denoted at 26 is an inner circumferential groove which is provided between the inner lip portion 23 on the side of bush and the interconnecting bridge portion 24. This inner circumferential groove 26 is formed as an annular groove of U- or V-shape in section, between the lip portion 23 on the side of bush and outer periphery 24B1 of the inner bridge portion 24B.

Further, the inner circumferential groove 26 on the side of bush is provided with an arcuately curved root portion 26A, which is located radially inward of a median point (the intermediate reference line L—L) between inner and outer peripheral ends of the lip portion 23 on the side of bush. In this instance, as shown in FIG. 5, the root portion 26A of the inner circumferential groove 26 is shallower than and located radially outward of the root portion 25A of the outer circumferential groove 25 on the side of track link.

Indicated at 27 in the drawing is an upper structure which is rotatably mounted on the lower structure 1, and at 28 is a working mechanism which is provided on a front portion of the upper structure 27.

Having the above-described arrangements according to the present embodiment, the hydraulic excavator can be driven in a forward or reverse direction on a road or working site by rotationally driving the drive sprocket 4 from a vehicular drive motor (not shown), turning the crawler belts 7 around and between idler wheel 3 and drive sprocket 4.

While the crawler belts 7 are being turned around as described above, the gap spaces between the outer link portions 9 of the track link 8 and the bushes 11 are sealed up by the respective seals 21 thereby preventing not only intrusion of dirt or other foreign matter from gap spaces between the bushes 11 and connecting pins 12 but also leakage of the grease which is filled in those gap spaces.

Figure 7:
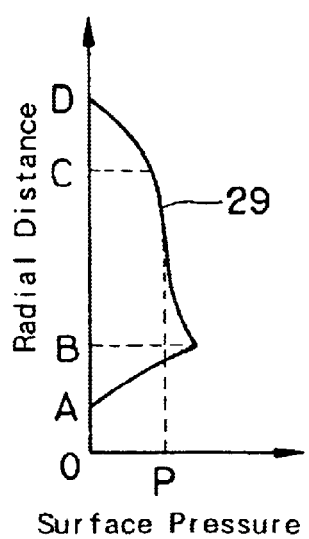
FIG. 7 is a characteristics diagram showing relations between surface pressure and radial distance from inner peripheral end a lip portion on the side of bush in the embodiment of the invention.

Shown in FIG. 7 is a characteristics diagram showing results of experiments of surface pressure distribution on the seal 21 according to the present embodiment of the invention.

In the diagram of FIG. 7, the horizontal axis represents surface pressure on the abutting surface 23A of the inner lip portion 23 on the side of bush, while the vertical axis represents radial distance from an inner reference line M—M at the inner peripheral end of the inner lip portion 23. Further, points A, B, C and D plotted on the vertical axis in the diagram of FIG. 7 correspond to positions A, B, C and D abutting surface 23A of the inner lip portion 23 shown in FIG. 6, respectively.

As clear by curve 29 in the characteristics diagram of FIG. 7, the surface pressure on the inner lip portion 23 on the side of bush gradually increases in a radially outward direction from the radially innermost position A of the abutting surface 23A, and reaches a maximum level at the position B. The surface pressure is maintained substantially at the same level P between the position B and the position C, and, is gradually reduced beyond the position C toward the position D.

Further, by measurement of compressive loads acting to compress the seal 21 between the outer link portion 9 and the bush 11, it has been revealed that the compressive load is as large as approximately $(2.5 \sim 3.5) \times 10^4$N (Newton) in the case of the present embodiment, which is larger than a value of a Comparative Example, which will be described below.

Figure 8:
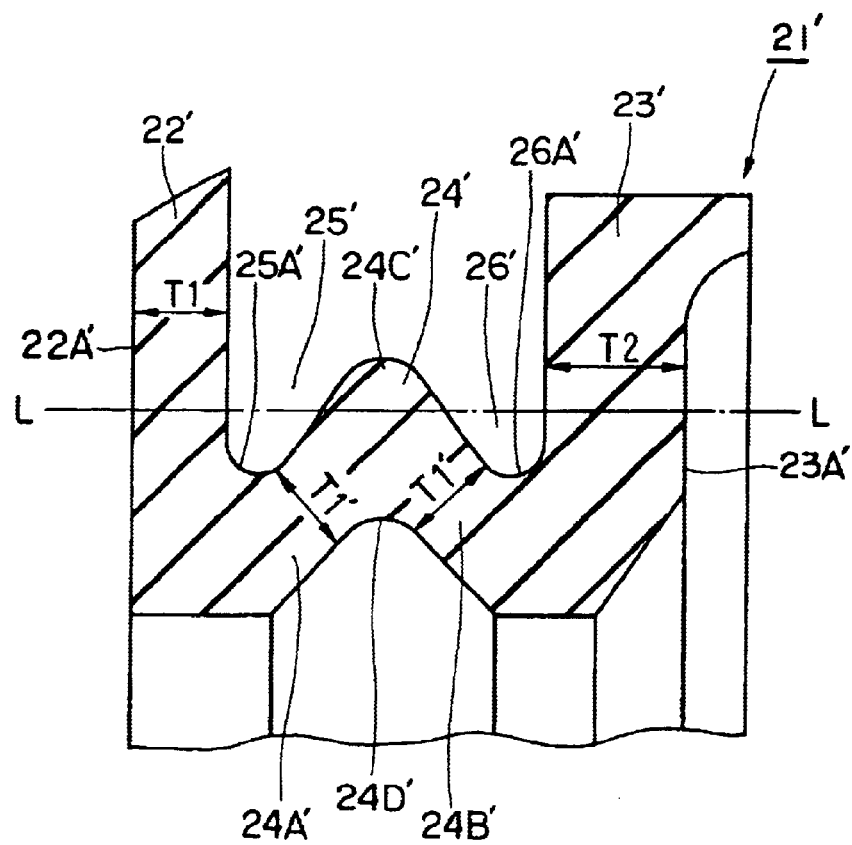
FIG. 8 is a sectional view similar to FIG. 5, showing a seal member of a comparative example.
Figure 9:
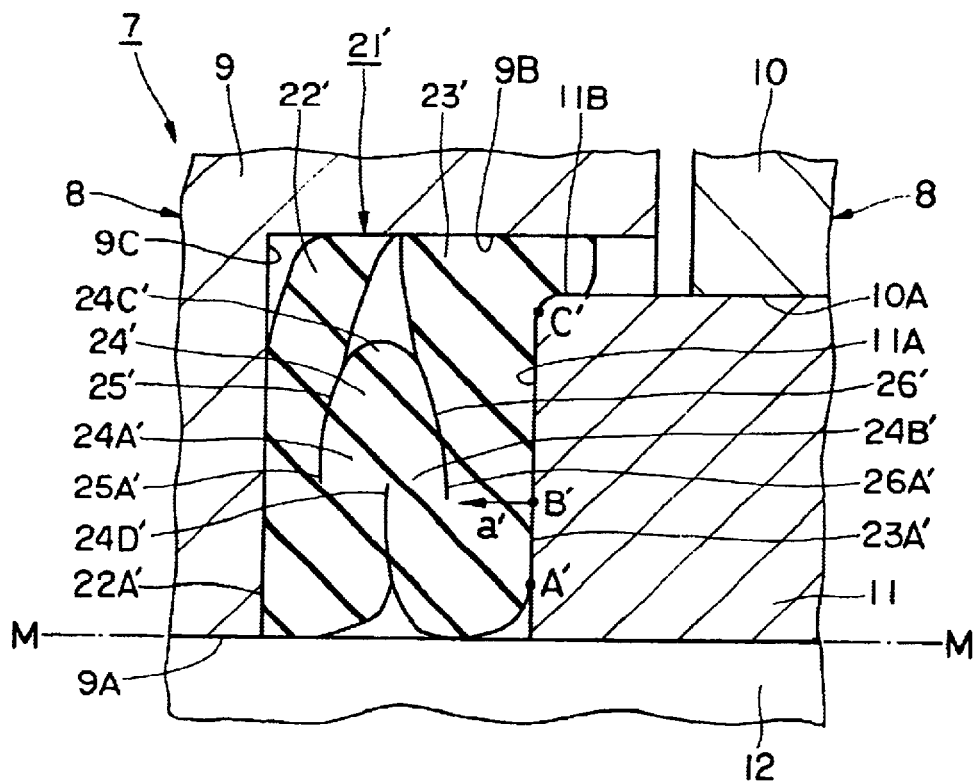
FIG. 9 is a sectional view similar to FIG. 6, showing the seal member of FIG. 8 which is mounted in position between an outer link portion of track link and a bush.
Figure 10:
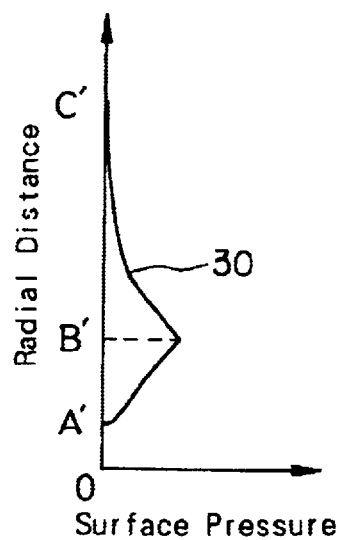
FIG. 10 is a characteristics diagram showing relations between surface pressure and radial distance from inner peripheral end a lip portion on the side of bush in the comparative example.

On the other hand, shown in FIGS. 8 and 9 is a seal 21' of Comparative Example. The characteristics diagram of FIG. 10 shows the results of experiments conducted on Comparative Example.

In this instance, similarly to the seal 21 according to the present invention, the seal 21' of Comparative Example is constituted by an outer lip portion 22' with an abutting surface 22A', an inner lip portion 23' with an abutting surface 23A', an interconnecting bridge portion 24', an outer circumferential groove 25 having a root portion 25A', and an inner circumferential groove 26' with a root portion 26A'. Further, the interconnecting bridge portion 24' is constituted by an outer bridge portion 24A' and an inner bridge portion 24B' with a maximum outside diameter 24C' and a maximum inside diameter 24D'.

Further, the outer lip portion 22' on the side of the track link and the outer bridge portion 24A' of the interconnecting bridge portion 24' are formed in thicknesses T1 and T1', respectively, while the inner lip portion 23' on the side of bush is formed in a thickness T2 which is larger than T1 and T1'.

However, in the case of the seal 21' of Comparative Example differs from the embodiment of the present invention in that the inner bridge portion 24B' of the interconnecting bridge portion 24' is formed in a thickness T1' which is same as the thickness of the outer bridge portion 24A' and thinner than the inner lip portion 23' on the side of bush.

In FIG. 10, the characteristics diagram for the seal 21', the horizontal axis represents surface pressure on the abutting surface 23A' of the inner lip portion 23' on the side of bush and the vertical axis represents radial distance from the inner reference line M—M at the inner peripheral end of the lip portion 23' on the side of bush. Further, the points A', B' and C' in FIG. 10 correspond to positions A', B' and C' in FIG. 9, respectively.

As indicated by curve 30 in the characteristics diagram of FIG. 10, surface pressure on the inner lip portion 23' on the side of bush increases toward radially outer positions from the radially inner position A' in the vicinity of the inner peripheral end of the abutting surface 23A', and reaches a maximum level at the position B'. From the position B', the surface pressure drops abruptly toward the radially outer position C'.

Further, in the case of Comparative Example, it has been revealed by measurements that the seal 21' is compressed between the outer link portion 9 and the bush 11 by a compressive load of approximately $(1 \sim 2) \times 10^4$N (Newton).

As described above, in the case of the embodiment of the present invention, the inner lip portion 23 on the side of bush is arranged to have the thickness T2 which is substantially same as the thickness T2' of the inner bridge portion 24B on the side of bush as expressed by the formula (4), and the inner circumferential groove 26 on the side of bush is shallower than the outer circumferential groove 25 on the side of track link.

Thus, when the seal 21 is fitted in a compressed state between the inner end face 9C of the outer link portion 9 and the end face 11A of the bush 11, a larger spring force is produced by cooperative actions of the inner peripheral portion (on the side of the inner peripheral surface 23D) of the lip portion 23 on the side of bush and the inner peripheral portion (on the side of the inner peripheral surface 24B2) of the inner bridge portion 24B on the side of bush, shifting the position of the maximum surface pressure (point B) on the inner lip portion 23 on the side of bush in a radially inward direction as compared with the position of the maximum surface pressure (point B') on the lip portion 23' on the side of bush in Comparative Example.

As a consequence, in the case of Comparative Example, abrasive wear progresses from the point B' on the abutting surface 23A' of the seal 21' in the direction toward the root portion 26A' of the circumferential groove 26' on the side of bush as indicated by arrow a' in FIG. 9.

In contrast, in the case of the embodiment of the present invention, abrasive wear can progress from the point B on the abutting surface 23A of the seal 21 in the direction from the inner lip portion 23 on the side of bush toward the inner bridge portion 24B as indicated by arrow a in FIG. 6, and yet the durability and service life of the seal 21 can be prolonged because of a broader range of allowance for abrasive wear.

Further, as described hereinbefore, the surface pressure on the lip portion 23 on the side of bush is increase on the radially inner side (on the side of the point B), so that the seal 21 can be pressed against the outer link portion 9 and the bush 11 against thrust force which is exerted to the seal 21 between the outer link portion 9 and the bush 11. This makes it possible to enhance the durability of the seal 21 and to magnify the seal capacity of the lip portion 23 on the side of bush.

Furthermore, according to the present embodiment, as described hereinbefore, seal 21 has the inner circumferential groove 26 on the side of bush formed shallower than the outer circumferential groove and at the same time has the maximum outside diameter portion 24C of the interconnecting bridge portion 24 located radially outward of an median position (the intermediate reference line L—L) of the lip portion 23 on the side of bush.

Therefore, when the seal 21 is fitted in a compressed state between the inner end face 9C of the outer link portion 9 and the end face 11A of the bush 11, the intermediate bridge portion 24 acts to prevent the inner lip portion 23 on the side of bush from being deformed in a direction away from the end face 11A of the bush 11. In this state, the lip abutting surface 23A of the lip portion 23 on the side of bush as a whole can be pressed uniformly against the end face 11A of the bush 11 as indicated by arrow b in FIG. 6.

As a consequence, as seen by curve 29 in the characteristics diagram of FIG. 7, the surface pressure on the inner lip portion 23 on the side of bush can be made uniform from the point B to the point C. This makes it possible to enhance the seal capacity of the lip portion 23 on the side of bush all the more, to prevent localized abrasive wear of the abutting surface 23A, and to improve the durability of the seal 21.

Moreover, according to the embodiment of the invention, the interconnecting bridge portion 24 of the seal 21 is provided with the outer bridge portion 24A of thickness T1', which is approximately same as the thickness T1 of the outer lip portion 22 on the side of track link, as expressed by the formula (3). Therefore, same as in the case of the inner lip portion 23 on the side of bush described above, it becomes possible to improve the durability of the outer lip portion 22 on the side of track link similarly by distributing the surface pressure uniformly over the lip portion 22 and at the same time preventing localized abrasive wear of the abutting surface 22A.

On the other hand, according to the present embodiment, the abutting surface 23A of the inner lip portion 23 on the side of bush is formed as a flat surface, and, as described hereinbefore, the surface pressure on the lip portion 23 on the side of bush is increased solely at the point B of FIG. 6. As a consequence, these arrangements contribute to prevent occlusion of dirt or other foreign matter between the outer lip portion 22 and the outer link portion 9 or between the inner lip portion 23 and the bush 11, one of the drawbacks discussed hereinbefore in connection with the prior art, thus enhancing the durability of the seal 21.

Further, since there is no need for the abutting surfaces 22A and 23A of the seal 21 to have a ridge portion as mentioned hereinbefore in relation with the prior art, the shape of the seal 21 as a whole can be simplified, permitting to fabricate the seal 21 in an efficient manner.

Furthermore, the interconnecting bridge portion 24 of the seal 21 has the maximum inside diameter portion 24D located radially on the inner side of an median position of the inner lip portion 23 on the side of bush, so that the interconnecting bridge portion 24 as a whole can be formed in a larger thickness T1' to produce a larger resilient force (a larger restoration force) in the interconnecting bridge portion 24 when the seal 21 is compressed between the outer link portion 9 and the bush 11, imparting higher seal capacity to the seal 21.

Moreover, as expressed by the formula (1), the seal 21 is provided with the outer lip portion 22 on the side of track link, the radial width D1 of which is slightly larger than the radial width D2 of the inner lip portion 23 on the side of bush, and the outer periphery 22B of the lip portion 22 on the side of track link is formed as an obliquely inclined tapered surface. As a result, when the seal 21 is fitted between the outer link portion 9 and the bush 11, the outer periphery 22B of the lip portion 22 on the side of track link can be forcibly pressed in a deformed state against the inner surface of the seal fitting bore 9B of the outer link portion 9 along with outer periphery 23C of the inner lip portion 23 on the side of bush as shown in FIG. 6 to augment the seal capacity of the seal 21 all the more.

In the foregoing embodiment, the present invention has been described by way of a hydraulic excavator as a typical example of crawler type vehicles. However, it is to be understood that the present invention is widely applicable to hydraulic cranes or other crawler type vehicles.

Industrial Applicability

As clear from the foregoing detailed description, according to the present invention, the inner lip portion on the side of bush is formed in a thickness which is substantially same as the thickness of an inner bridge portion of an interconnecting bridge portion on the side of track link but larger than thicknesses of the outer lip portion on the side of track link and an outer bridge portion of the interconnecting bridge portion, and a maximum outside diameter portion of the interconnecting bridge portion is located radially outward of a median point between inner and outer peripheries of the inner lip portion on the side of bush, for producing a greater spring force can be produced by the inner bush portion and the inner bridge portion and augmenting the surface pressure in radially inner portions of the lip portion on the side of bush and in abutting engagement with the bush while pressing the inner lip portion as a whole uniformly against an end face of the bush through the interconnecting bridge portion.

Thus, the above-described arrangements contribute to maintain uniform surface pressure on the inner lip portion on the side of bush and to enhance the seal capacity of the inner lip portion on the side of the bush, preventing localized abrasive wear of the abutting surface of the inner lip portion on the side of bush to prolong the durability and service life of the seal.

What is claimed is:

1. A crawler belt having endlessly connected right and left track links each formed with an outer link portion and an inner link portion at opposite longitudinal ends thereof, respectively, bushes located transversely between inner link portions of said track links and having opposite axial ends in face to face relation with said outer link portions, connecting pins placed in said bushes and having opposite axial end portions fitted in and connected to said outer link portions, and a seal fitted around an outer periphery of each one of said connecting pins and between an outer link portion of said track links and an opposing end of said bush, wherein:

said seal is comprised of an outer lip portion provided on the side of said track link and held in abutting engagement with an inner end face of said outer link portion, an inner lip portion provided on the side of said bush and held in abutting engagement with an end face of said bush, and an interconnecting bridge portion of V-shape in cross-section interconnecting said outer and inner lip portions integrally with each other;

said interconnecting bridge portion of V-shape in comprised of an outer bridge portion obliquely connected to an inner peripheral end of said outer lip portion on the side of said track link, and an inner bridge portion obliquely connected to an inner peripheral end of said inner lip portion on the side of said bush;

said inner bridge portion has a thickness at its thinnest portion that is of a greater thickness than a thickness of said outer bridge portion at its thinnest portion;

said inner lip portion has a thickness which is substantially the same as said thickness of said inner bridge portion;

said outer lip portion has a thickness which is substantially the same as said thickness of said outer bridge portion; and a maximum outside diameter portion in a boundary region between said outer bridge portion and said inner bridge portion of said interconnecting bridge portion is located radially outward of a median position between inner and outer peripheral ends of said inner lip portion on the side of said bush.

2. A crawler belt as defined in claim 1, wherein a maximum inside diameter portion in a boundary region between said outer bridge portion and said inner bridge portion of said interconnecting bridge portion is located radially inward of a median position (L—L) between inner and outer peripheral ends of said inner lip portion on the side of said bush.

3. A crawler belt as defined in claim 1, wherein said inner lip portion on the side of said bush is provided with a flat abutting surface for abutting engagement with an end face of said bush.

4. A crawler belt as defined in claim 1, wherein said outer lip portion on the side of track link is provided with a flat abutting surface for abutting engagement with said outer link portion.

5. A crawler belt seal, comprising;
an outer lip portion provided on the side of a track link and held in abutting engagement with an inner end face of an outer link portion, an inner lip portion provided on the side of a bush and held in abutting engagement with an end face of said bush, and an interconnecting bridge portion of V-shape in cross-section interconnecting said outer and inner lip portions and integrally with each other;
said interconnecting bridge portion of V-shape having an outer bridge portion obliquely connected to an inner peripheral end of said outer lip portion on the side of track link, and an inner bridge portion obliquely connected to an inner peripheral end of said inner lip portion on the side of said bush;
said inner bridge portion having a thickness at its thinnest portion that is of a greater thickness than a thickness of said outer bridge portion at its thinnest portion;
said inner lip portion having a thickness which is substantially the same as the thickness of said inner bridge portion on the side of said bush;
said outer lip portion having a thickness which is substantially the same as the thickness of said outer bridge portion on the side of said track link; and
a maximum outside diameter portion in a boundary region between said outer bridge portion and said inner bridge portion of said interconnecting bridge portion is located radially outward of a median position between inner and outer peripheral ends of said inner lip portion on the side of said bush.

6. A crawler belt seal as defined in claim 5, wherein a maximum inside diameter portion in a boundary region between said outer bridge portion and said inner bridge portion of said interconnecting bridge portion is located radially inward of a median position between inner and outer peripheral ends of said inner lip portion on the side of said bush.

7. A crawler belt seal as defined in claim 5, wherein said inner lip portion on the side of bush is provided with a flat abutting surface for abutting engagement with an end face of said bush.

8. A crawler belt seal as defined in claim 5, wherein said outer lip portion on the side of track link is provided with a flat abutting surface for abutting engagement with said outer link portion (9).

9. A crawler belt having endlessly connected right and left track links each formed with an outer link portion and an inner link portion at opposite longitudinal ends thereof, respectively, bushes located transversely between inner link portions of said track links and having opposite axial ends in face to face relation with said outer link portions, connecting pins placed in said bushes and having opposite axial end portions fitted in and connected to said outer link portions, and a seal fitted around an outer periphery of each one of said connecting pins and between an outer link portion of said track links and an opposing end of said bush, wherein
said seal comprises:
an outer lip portion of an annular shape,
an inner lip portion of an annular shape,
an interconnecting bridge portion of an annular shape and having a V-shape in cross section, further having an outer bridge portion connected with an inside portion of said outer lip portion and an inner bridge portion connected with an inside portion of said inner lip portion, respectively; and
a thickness of said inner bridge portion at a thinnest portion thereof being greater than a thickness of said outer bridge portion at a thinnest portion thereof.

10. A crawler belt as defined in claim 9, wherein
an outer peripheral surface of said outer lip portion has a diameter that is greater than a diameter of an cuter peripheral surface of said inner lip portion, and has a tapered surface.

11. A crawler belt seal comprising:
an outer lip portion of an annular shape,
an inner lip portion of an annular shape,
an interconnecting bridge portion of an annular shape and having a V-shape in cross section, further having an outer bridge portion connected with an inside portion of said outer lip portion and an inner bridge portion connected with an inside portion of said inner lip portion, respectively, and
a thickness of said inner bridge portion at a thinnest portion thereof being greater than a thickness of said outer bridge portion at a thinnest portion thereof.

12. A crawler belt seal as defined in claim 11, wherein
an outer peripheral surface of said outer lip portion has a diameter that is greater than a diameter (D2) of an outer peripheral surface of said inner lip portion, and has a tapered surface.

* * * * *